(12) United States Patent
Sun

(10) Patent No.: US 8,195,838 B2
(45) Date of Patent: *Jun. 5, 2012

(54) MULTIPLE URL IDENTITY SYNTAXES AND IDENTITIES

(76) Inventor: Chen Sun, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,209

(22) Filed: May 23, 2011

(65) Prior Publication Data

US 2011/0219075 A1 Sep. 8, 2011

Related U.S. Application Data

(63) Continuation of application No. 12/387,545, filed on May 4, 2009, now Pat. No. 7,958,266.

(51) Int. Cl.
 *G06F 15/16* (2006.01)
(52) U.S. Cl. ........................................ 709/245; 709/200
(58) Field of Classification Search ........................ None
 See application file for complete search history.

(56) References Cited

U.S. PATENT DOCUMENTS

| | | | |
|---|---|---|---|
| 5,812,769 A | 9/1998 | Graber et al. | |
| 6,085,242 A | 7/2000 | Chandra | |
| 6,324,538 B1 | 11/2001 | Wesinger et al. | |
| 6,374,259 B1 | 4/2002 | Celik | |
| 6,442,602 B1 | 8/2002 | Choudhry | |
| 6,487,584 B1 | 11/2002 | Bunney | |
| 6,691,158 B1 | 2/2004 | Douvikas et al. | |
| 7,007,068 B2 * | 2/2006 | Morkel | 709/245 |
| 7,302,634 B2 | 11/2007 | Lucovsky et al. | |
| 7,543,078 B2 | 6/2009 | Sun | |
| 7,564,962 B1 | 7/2009 | O'Keeffe | |
| 7,747,746 B2 * | 6/2010 | Thayer et al. | 709/245 |
| 7,848,781 B2 | 12/2010 | Bhat et al. | |
| 7,933,587 B1 * | 4/2011 | Swan | 709/218 |
| 8,005,970 B2 * | 8/2011 | Thayer et al. | 709/245 |
| 2002/0152265 A1 | 10/2002 | Felman | |
| 2002/0188606 A1 | 12/2002 | Sun | |
| 2006/3005092 | 3/2003 | Sun | |
| 2004/0205243 A1 | 10/2004 | Hurvig et al. | |
| 2005/0251448 A1 * | 11/2005 | Gropper | 705/14 |
| 2007/0266118 A1 * | 11/2007 | Wilkins | 709/219 |
| 2007/0266156 A1 * | 11/2007 | Wilkins | 709/225 |
| 2008/0205655 A1 | 8/2008 | Wilkins et al. | |
| 2009/0234970 A1 | 9/2009 | Sun | |
| 2010/0198854 A1 | 8/2010 | Chitturi et al. | |

FOREIGN PATENT DOCUMENTS

WO    WO 2008037164 A1 *    4/2008

OTHER PUBLICATIONS

NNRD449120. "e-business Card System." IBM Technical Disclosure Bulletin. Sep. 1, 2001. UK. Issue 449, p. 1571. 3 pages.*
Postel, J., "Domain Name System Structure and Delegation", RFC 1591 Network Working Group, Mar. 1, 1994, 7 pages.
Mockapetris, P., "Domain Names- Concepts and Facilities", RFC 1034 Network Working Group, Nov. 1, 1987, 55 pages.

* cited by examiner

*Primary Examiner* — Jeffrey R Swearingen

(57) ABSTRACT

Any arrangement of URLv identity syntax can now be used in a repository, once its second.top domain is known to have an identity syntax. The repository can extract, select, store, organize, prioritize, and consolidate URLvs of differing identity syntaxes. The correlation and association among different contact entities' containing the same individual's identities can yield accurate same individual's identity and URLvs. These increase the competition of the Internet by enabling users to transport their data easily to websites allowing for individuals' data-transport.

16 Claims, 6 Drawing Sheets

Encoded Identity URLvs

Universal Syntax Identity--USI

Universal Syntax Identity–USI

Multiple Identity Syntax--MIS

Associated Identities Individual--All (derived from Figure 1)

Encoded Identity URLvs

MULTIPLE URL IDENTITY SYNTAXES AND IDENTITIES

CROSS-REFERENCE TO RELATED APPLICATIONS

This application is a continuation of co-pending U.S. application Ser. No. 12/387,545, filed May 4, 2009, now U.S. Pat. No. 7,958,266, and entitled "Multiple URL Identity Syntaxes and Identities." Accordingly, this application claims benefit of U.S. patent application Ser. No. 12/387,545, now U.S. Pat. No. 7,958,266, under 35 U.S.C. §120. U.S. patent application Ser. No. 12/387,545, now U.S. Pat. No. 7,958,266, is herby incorporated in its entirety.

TECHNICAL FIELD OF INVENTION

This invention relates to personal digital representation and multiple-identities, web exchanges (marketplaces) that work with these, contacts management, and individuals' web data repositories.

INCORPORATION BY REFERENCE

U.S. Pat. No. 6,442,602, U.S. application Ser. No. 09/642,127 filed by Azkar Choudhry on Aug. 18, 2000 and Ser. No. 10/190,283 filed Jul. 5, 2002; U.S. application Ser. No. 09/853,167 filed jointly by Chen Sun and Azkar Choudhry on May 11, 2001; and U.S. application Ser. Nos. 10/074,081, 10/189,063, 10/190,283, and 10/630,335 filed by Chen Sun on Feb. 1, 2002, Jul. 2, 2002, Jul. 5, 2002, and Jul. 30, 2003 respectively; are incorporated herein by reference in their entirety, including drawings, and are hereby made a part of this application.

BACKGROUND

Social networking websites are websites with participant individuals' data socializing on a web community. In Web 3.0 preliminary discussions, data portability is the individual user's option to use his personal data among such social networking websites. Presently, individual users can't easily exchange his web content or easily use his own preferred second.top domain name.

U.S. application Ser. No. 10/630,335 entitled Individuals' URL Identity Exchange and Communications, by Chen Sun, hereafter referred to as SSIRA (Set Syntax Identity Repository Application), introduced the concept of a repository to store URL names that can be used to exchange, consolidate, and utilize an individual's web data. SSIRA's URLs have a set syntax with the individual's name in the third-level-domain name. This continuation-in-part application is directed to determining what is an individual's identity syntax in other URL locations (Universal Syntax Identity—USI), with using multiple identities in a SSIRA-modified repository called multiple identity syntax repository (MIS), and with associating the multiple identities and profiles of the same individual—Associated Identities Individual—(AII).

Some of the methods used in SSIRA are briefly introduced here. The SSIRA URL is a web addressable individual's profile, and its web content contains extractable, exchangeable data of the individual. A SSIRA URL-names storage repository extracts this data, selects, and organizes the data along with other URLs with common identities, which also have a set-syntax name of [Name.Second.Top/File-Suffix]. The methods of data extraction include XML, HTML commentaries, set data structures, and others. The SSIRA would then consolidate these extracted data to the same individual, based on utilizing same identities, and then present the consolidated data with individuals' URLvs. Full details including drawings of SSIRA are included with U.S. patent application Ser. No. 10/630,335, which is incorporated by reference.

Individual's identity URLv names, if used, can be found anywhere in the URLv. An automated mechanism to determine the URLv's identity name syntax (aka identity syntax) would be advantageous. The identity syntax can be used to determine identities which can then be used to consolidate profiles to form individual's consolidated object entities, an example of which are contact entities in contact management systems.

Multiple identity syntaxes and multiple identities can be used by a single individual. It is further advantageous to determine and/or consolidate the multiple URLv profiles from differing secondary-top domain names that a single individual may have. For example, how to associate the same individual JohnT's URLvs JohnT.ABC.com/Band with his www.MySpace.com/JohnT.

SUMMARY

Any arrangement of URLv identity syntax can now be used in a repository, once its second.top domain is known to have an identity syntax. The repository can extract, select, store, organize, prioritize, and consolidate URLvs of differing identity syntaxes. The correlation and association among different contact entities' containing the same individual's identities can yield accurate same individual's identity and URLvs. Other aspects of the invention will be apparent from the following description and the appended claims.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

TERMINOLOGY

Figure 1:
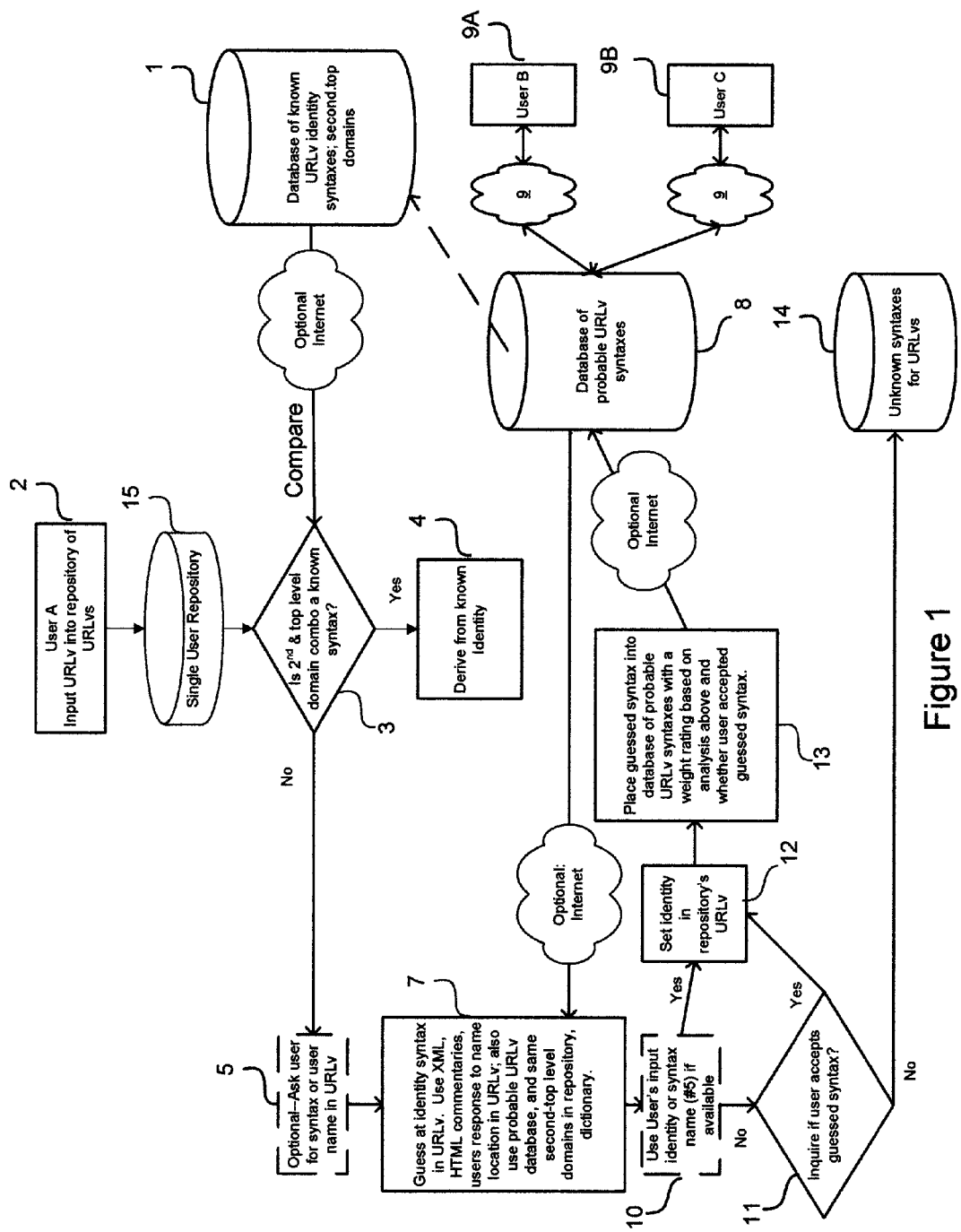
FIG. 1 shows a flow diagram for Determining Syntax in URLv Identity USI

Many of the terms used in this application are similar to those in SSIRA. URLvs (URL verbals) are URLs without the "http:" prefix. URLvs can be used to represent individuals; a specific URLv and its web content is an individual's profile; and the individual's name or representation name can be embedded in the URLv. A popular example of a Name syntax is www.MySpace.com/Name. Another syntax is Wordpress. com's and Ning.com's, which use the same syntax as SSIRA's—[Name.Second.Top/File-Suffix], for example, John.ABC.com/Personal.

SSIRA used the syntax [named-third-second.top-level domain names—abbreviated named-third.second.top] as the identity syntax to manipulate same identitied profiles. For example, {JohnT.ABC.com} is the identity, which may have numerous profiles, including JohnT.ABC.com/cars/Ford, JohnT.ABC.com/Toyota, and JohnT.ABC.com/Dating, and [Name.ABC.com/FS] is the identity syntax.

Clarification of Terms:

Name, when used for a person's name. (aka individual's name or individual's representation name.)—an individual's name or representation of his name. That is, instead of Joseph A. Smith, it can be Joe, JoeSmith, or even a representation for him, such as JoeBob or even a HandleName1355. In this application, the name in the URLv is usually a representation of his name.

Name, when used in domains structure—the DNS domain's names—top, second, third . . . .

Identity—a computer manageable text representation of an individual's name, and the name represents the person's actual name, nick name, alias, web name, etc.

Encoded identity—a computer manageable text representation of an individual's name where the name is encoded, (usually a number or non-comprehensible text; and usually created as a part of a variable to pass the individual's representation to the web server) within the URLv.

A person is a human being. A user is a person using a software application. An individual refers to a specific person, and often, in this application, the individual can be represented by an identity name in his URLv. A contact entity of a contact management system can also represent an individual. Note that the contact entity itself may have several same individual URLv identity names—these are still representations of the individual.

Single individual's consolidated object entity—a data-consolidated object comprising of various data sources from an individual. This can created by aggregating his multiple URLvs' profiles' webpages.

Contact entity—an individual's representation with his associated data in a contact manager. For example, a contact entity of an individual in Microsoft Outlook's or ACT contact managers' portions. A contact entity is usually a form of single individual's consolidated object entity.

Syntax of the URLv—how the URLv syntax is structured.

URLv Identity syntax—what is the URLv syntax for an individual's name within a URL or URLv.

For example, consider http://Steve.ABC.com/Janis. If "Steve.ABC.com" is the identity; then "ABC.com/Janis" is not the identity. The URLv identity syntax for ABC.com is [NAME.ABC.com], where NAME is the individual's name.

Another example—www.Myspace.com/Steve/Janis If "Myspace.com/Steve" is the identity, then the URLv identity syntax for Myspace.com is [Myspace.com/NAME]

Simple URLv Identity Syntax—URLv identity syntaxes where NAME is not web application coded and is usually located adjacent to the second.top domain names. For examples, Steve.ABC.com/FS1 and ABC.com/John/FS2.

Complex URLv Identity Syntax—URLv identity syntaxes where NAME is usually web application coded, is located in the file-suffix, and the NAME is often in different locations in different file suffixes of the same NAME individual's webpages. Frequently generated by web content management systems and web databases, frequently uses symbols, in particular, as "?", to suggest variables.

Profile—one of several web addressable pages of the same identity.

URLv—a URL without the protocol portion—without the http://.

SSIRA—Set-Syntax-Identity Repository Application—U.S. application Ser. No. 10/630,335 with a database field that accepts multiple inputted URLv profiles of an URLv identity. SSIRA can extract, select, sort, organize, prioritize, and consolidate URLvs web-accessed data based on named-third.second.top domains syntax.

SSIR—the set-syntax-identity repository type found in SSIRA.

USI—embodiment type that identifies the URLv identity syntax of any identity URLv.

MIS—embodiment type that utilizes multiple identity syntaxes in a SSIRA-like repository.

AII—embodiment type that associates probabilistic identities and URLvs from multiple users to associate with a single individual.

User URLv repository—a storage location for a user's inputted URLvs. Example is a personal contact manager.

Correlate is a probability and statistics (hereafter a.k.a. probability-statistics) method. Associate in the context of identities means acceptable degree of correlation to join as one.

Popular Names Dictionary Database—a database that comprises of popular people's names, e.g. John, Mary, Sue, James, Jim, etc. Such database can be created by taking names from books that suggest birth names or from phone books. Databases can be customized by languages and cultures.

Formatting of identity, identity syntax, profile, and URLv names will facilitate easier reading. The identity is a text string in the URL to be manipulated, and uses { } marks, for example, {Steve.ABC.com}. A URLv syntax is identified in [ ], as in ABC.com's URLv syntax is [Name.ABC.com]. Each of Steve.ABC.com's URLv profiles is web addressable and underlined: Steve.ABC.com and Steve.ABC.com/FS1.

DETAILED DESCRIPTION

There are numerous challenges to determining a syntax identity in URLvs, including:
1. There is no set accepted syntax format for an individual's name in the URLv. It may not be there, or it may be in anywhere within the URLv syntax. Additionally, many content manager systems and web databases code the individual's names within URLs such that an individual's representation is not easily humanly readable within the URL syntax;
2. Common names owned by multiple people are challenging in computing. For examples, the common names Steve, John, Mary, Joan, Karim, Jose, Chen, etc. of the world. Two same named Steves may cause difficulties in the URLv syntax. For example, cannot have identity {Steve.ABC.com} for two individuals; and
3. Foreign names add still more complexity, as even names that wouldn't be used in the United States; for example "index", might be someone's foreign name. "Index" can interfere with web server's common usage of URLs.

There are a few general current trends about individual representation names in URLvs, including:
1. The most common simple syntax forms currently are [Name.ABC.com/file-directory] or [www.ABC.com/Name], with "Name" as the first directory name;
2. As seen in SSIRA, once a URLv identity can be derived, it can form unique branding for the individual. Furthermore, as explained in SSIRA, a derived identity can be used to consolidate and prioritize individual's data; and
3. Notice that a URLv's webpage's content itself may have no identification of the individual. For example, in JohnT.ABC.com/cars/Ford, the associated webpage may have no information about JohnT, and be, instead filled with Ford cars information only.

One or more embodiments of this invention are directed towards deriving identity syntaxes of individuals' URLvs (USI), use these multiple identity syntaxes of differing second.top domains to create individual entities (objects) with numerous profiles (MIS), integrate and orderly present these entities' URLvs accompanied with their standard organizational website addresses (usually prefixed www), and determine which URLvs with differing second.top-level-domains belong to the same individual (AII).

Determining the Identity Syntax in URLv

SSIRA showed the idea for a repository of URLvs with identities that could consolidate the URLvs' associated download data using the identities. SSIRA identity syntax was the individual's named-third-level-domain name coupled with second.top level domain names. Below describes how to determine other forms of identity syntaxes. Once a URLv identify syntax can be identified, a lot of database storage and processing power is saved because an identity syntax can cover millions of identities.

One type includes a user on a personal computer with access to an Internet-connected browser and an Internet-connected Apache-Linux server computer running Apache web server (manufactured by Apache Software Foundation). On this web server is a database, such as mySQL (manufactured by Sun Microsystems) and languages and/or PHP (manufactured by the PHP Group). Several Domain Name Servers, as part of the Internet, may also be involved.

The personal and server computers may be an IBM PC-compatible computer. Many other types of computing devices can be used including, for users, any device with functionality to display URLs and connect to the Internet, for example, PDAs, cellular phones, laptops, Windows PCs, attached UNIX computer terminals, and more. The type of server software can be any web server software, including web servers from Microsoft and other web UNIX-flavor web servers. Programming languages can include Visual Basic, C, C++, Perl, ASP, Outlook's scripting language, PHP, and numerous others.

One embodiment of the invention involves a contact management system, similar to SSIRA's, because contact managers is commonly used, making the explanations here easy to understand and clearer, and because the contact manager's user typically knows the contact entity's individual. Just as SSIRA's contact management system is only one of many SSIRA embodiments, in this invention, the contact management system is only one of many SSIRA-similar embodiments. The embodiments can include eCommerce, matchmaking, employment, alumni, digital identification, national defense, discussion forum, political and social websites, social networking, and others similar to and described in the SSIRA. The workings of this invention includes functionality to cover most types of websites where the individual can have a name representation in the URL; thus, the full scope of embodiment types is more than as enumerated in this paragraph.

To help in the understanding of the invention, we'll initially discuss Simple URLv Identity Syntax—URLv identity syntaxes where NAME is not a web application code and is usually located adjacent to the second.top domain names. For examples, Steve.ABC.com/FS1 and ABC.com/John/FS2. Toward this end, we'll discuss complex URLv Identity Syntax—URLv identity syntaxes where NAME is often web application coded, is located in the file-suffix, and the NAME is often in different locations in different file suffixes of the same NAME individual's webpages.

FIG. 1 USI—Determining Identity Syntax in an Unidentified Simple URLv

Step 1 (Optional)

Provide a database of known identity URLv syntaxes for second.top level domains ((1) in FIG. 1). For example, popular websites with known identity names syntaxes such as [Myspace.com/Name], [Name.Ning.com/profile].

(Notice that known identity representations can be coded—an encoded identity. For example, in a SocialNetworking.com type URL http://www.SocialNetworking.com/home.php#/profile.php?id=671298689&v=wall&viewas=1407187839, the "671298689" is a coded representation of the individual that is used on many of his or her SocialNetworking webpages. Working with encoded identity representations in URLvs is described later.)

Step 2

Provide single user's repository for URLvs. ((15) in FIG. 1)

Step 3

Input an URLv into the repository (e.g. (2) in FIG. 1). If URL is used, strip out the "http:".

Step 4

Parse the inputted URLv for the second.top domain names combination (hereafter second.top domains) and compare this with the database of known-identity URLv syntaxes ((1) in FIG. 1). Next, Determine whether the second.top domains matches a known identity second.top's syntax in the database ((3) in FIG. 1). If yes, inputted URLv's identity is derived from the known identity syntax ((4) in FIG. 1).

Step 5 (Optional)

If no, ask the user to select an identity name from among the parsed URLv parts ((5) in FIG. 1). Selecting is usually done by adjacent domain name levels and file directories. If user selects an identity name, store its syntax. For example, the URLv input is Steve.ABC.com/Janis. The user selects {Steve.ABC.com} as the identity; hence, {ABC.com/Janis} is not the identity. The user's identity syntax for ABC.com is [Name.ABC.com]. Another input is www.Myspace.com/Steve/Janis. The user selects {Myspace.com/Steve} as the identity, then the user's selected identity syntax for Myspace.com is [Myspace.com/Name].

Selecting does not have to be adjacent domain names or file suffixes. For example, in www.SocialNetworking.com/people/Laura-Stevens/671298689", the identity can include "SocialNetworking.com" together with "Laura-Stevens", with "people" as a filler.

This user's selected identity syntax is not necessarily the true or probabilistic URLv identity syntax because the user may be mistaken, as explained in Step 9 below and also in the descriptions of FIGS. 2 & 3.

Step 7 (Note: Step 6 is Intentionally Skipped)

Use an algorithm to guess-estimate the true identity syntax of the second.top domains.

Use below probability-weighted factors algorithm to guess-estimate the identity syntax ((7) in FIG. 1). When an identity is guessed or known, its syntax is also guessed or known; for example, if John.ABC.com is a guessed identity, then [Name.ABC.com] is a guessed syntax. (However, the reverse is not necessarily true, that is, when an identity syntax is known, the identity is known. For example, [Name.ABC.com] may be a syntax, but John.ABC.com identity does not exist.).

Probability Weighted Factors to Guess-estimate of True Identity and Syntax Factors 1. The optional user's own identity selection from Step 5 (above) or his acceptance of the guessed syntax in step ((11) in FIG. 1) (found below).

2. The http:// access of the URLvs can have individual's exchangeable data field contents. This can be via XML and can be data fields or HTML commentaries as described in SSIRA. Also, compare the person's named fields in the XML or commentaries against the parsed URLv, and see if anything in the parsed URLv matches.
3. Use the third-level domain name, and then the first file suffix directory, to see if these are suitable.
4. Use the database of probabilistic URLv name syntaxes ((8) in FIG. 1)—that is, prior gathered guesses as to what is the name syntax in this second.top-level domain name combination. This database ((8) in FIG. 1) may contain other users' guess-estimate of second.top syntaxes.
5. Use existing URLvs in the same user's repository of the same entity (in contact managers, the same contact entity). Parse these, and see if there are similarities, particularly in third level domain or first file directory names of matching second.top domains. Exclude certain third level names, such as www or none, and exclude certain file directory names, such as index. This is different from #4 above because, generally, in a contact manager, its user knows the named individual being inputted, and the possibility of the same named identity in another URLv is very good. For example, if there is John.ABC.com/cars already in the repository's contact entity, and then John.ABC.com/boats is entered into the same contact entity, then, "John.ABC.com" is possibly an identity, and [Name.ABC.com] an identity syntax. Another example, suppose DEF.com/John/FS1, DEF.com/John/FS2, . . . . DEF.com/John/FSn are already in the contact entity, this gives an excellent clue that [DEF.com/John] is an identity.
6. Use URLvs with same second.top domains in user's repository (contact manager) of different entity (contact entity). For example, if Mary.ABC.com/planes is in another contact entity's URLv field of same user contact manager and its guessed identity syntax of [Name.ABC.com] has a high weighted factor, this further suggests [Name.ABC.com] is an identity.
7. Use popular people's name database to compare with parsed syntax, particularly the third level domain name and first directory name. Compare this further with any downloaded information and parsed URLv.

Following are example weights for guessed syntaxes (e.g. (7) in FIG. 1). The weighing and type of factors can be adjusted in the algorithm.

John.ABC.com/boats is entered.
1. User selects [Name.ABC.com] +5
2. XML data indicates {John.ABC.com} is identity +7
3. [Name.domain.com] is a popular style of URLv identity syntax +2
4. Other users have also guessed [Name.ABC.com] often as identity +5
5. John.ABC.com/cars is also in the contact entity +1
6. Mary.ABC.com/planes is in the contact manager, and its [Name.ABC.com] is also probable identity syntax. +2

John is a popular name and located in third-level-domain-name. +1

Total user's probabilistic rating score of 23 based on 7 criteria that {John.ABC.com} is an identity; hence, [Name.ABC.com] is a "23" weighted identity syntax.

Suppose Steve.XYZ.com/35323/er43.php is instead inputted
1. User selects [XYZ.com/Name] +5
2. No XML data is available +0
3. [XYZ.com/number] is not a popular style of URLv syntax +0
4. No other users have guessed XYZ.com/number as an identity syntax +0
5. No other URLv is in the contact entity that also has XYZ.com +0
6. No other XYZ.com/Name is in the contact manager as a guessed identity syntax.

XYZ.com/35323's total user's probabilistic rating score is 5, and it is less likely an identity presently, and [XYZ.com/Name] is an unlikely "5" weighted syntax.

If user chose a name in the URLv (step 5), use that syntax to show in his preferred identity ((10) in FIG. 1). If guess-estimate algorithm is used, request user whether he will accept the guesstimate identity syntax? ((11) in FIG. 1). Set URLv identity for this user's personal usage of this URLvs within his contact manager ((12) in FIG. 1). This is not necessarily the same identity or syntax as the probabilistic or true URLv identity syntax, described below.

Step 8

Use the results from the above algorithm and weights; then set a probabilistic rating on the guessed [second.top identity syntax] ((13) in FIG. 1). Send this information to the database of probabilistic URLvs syntaxes (e.g. (8) in FIG. 1), with this probabilistic, weighted score rating.

Other users (e.g. (9A) and/or (9B) in FIG. 1) using their own USI contact managers will generate probabilistic weighted syntax ratings and guessed identity syntax on their own held URLvs. Each relays its assessed weighted probabilistic rating and guessed identity to the database of probabilistic URLv syntaxes ((8) in FIG. 1). The database can then calculate an overall rated probabilistic syntax, as will be explained in FIG. 2.

Figure 2:
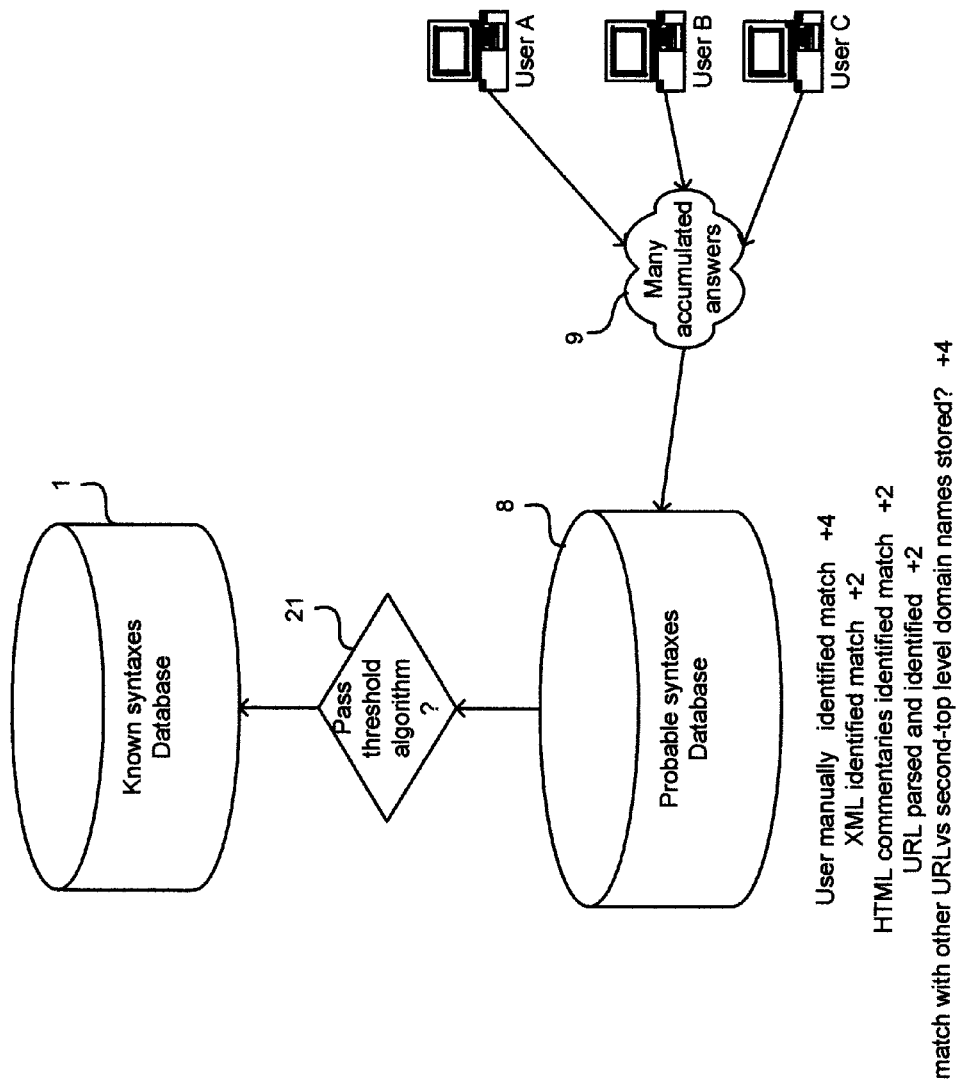
FIG. 2 shows a flow diagram for determining known from probable URLv syntax in USI

FIGS. 1 and 2 show only few web connections. This is because many data connections can be via web or even frequently local, depending on the embodiments. For example FIG. 2's users' repositories can be local and then connected via the web (e.g. (9) in FIG. 1) to the probabilistic database (e.g. (8) in FIG. 1). Alternatively, these users' repositories can be all on the web, as parts of a common multi-user database. Such repository designs are familiar to anyone skillful in multi-user web programming methods, and also, the users' separation of the URLv repository parts local or online is explained in SSIRA.

When the users' repositories are local, these repositories can be software databases located on a personal computer, PDA, cell phone, laptop, all of which can have access to the Internet. The databases of the known identity syntax and probable syntaxes (e.g. (1) and (8) in FIG. 1) are typically on a web server, as these are efficient locations so that such information can be shared with other users (e.g. (9A) or (9B) in FIG. 1). Presently, most contact managers (user repositories) are local to the user, and for this reason, the amount of data needed to be uploaded to the web is an important bandwidth factor.

When the users' repositories are on the web, as with a multi-user database on a web server, the users can use a personal computer, PDA, cellphone, laptop, or other http: accessible device to access the repositories on the web server.

In another embodiment, the repositories' original URLvs can also be uploaded with the guessed identity and weights to the database of probable syntaxes. This will prove to be useful in the AII version below.

Figure 5:
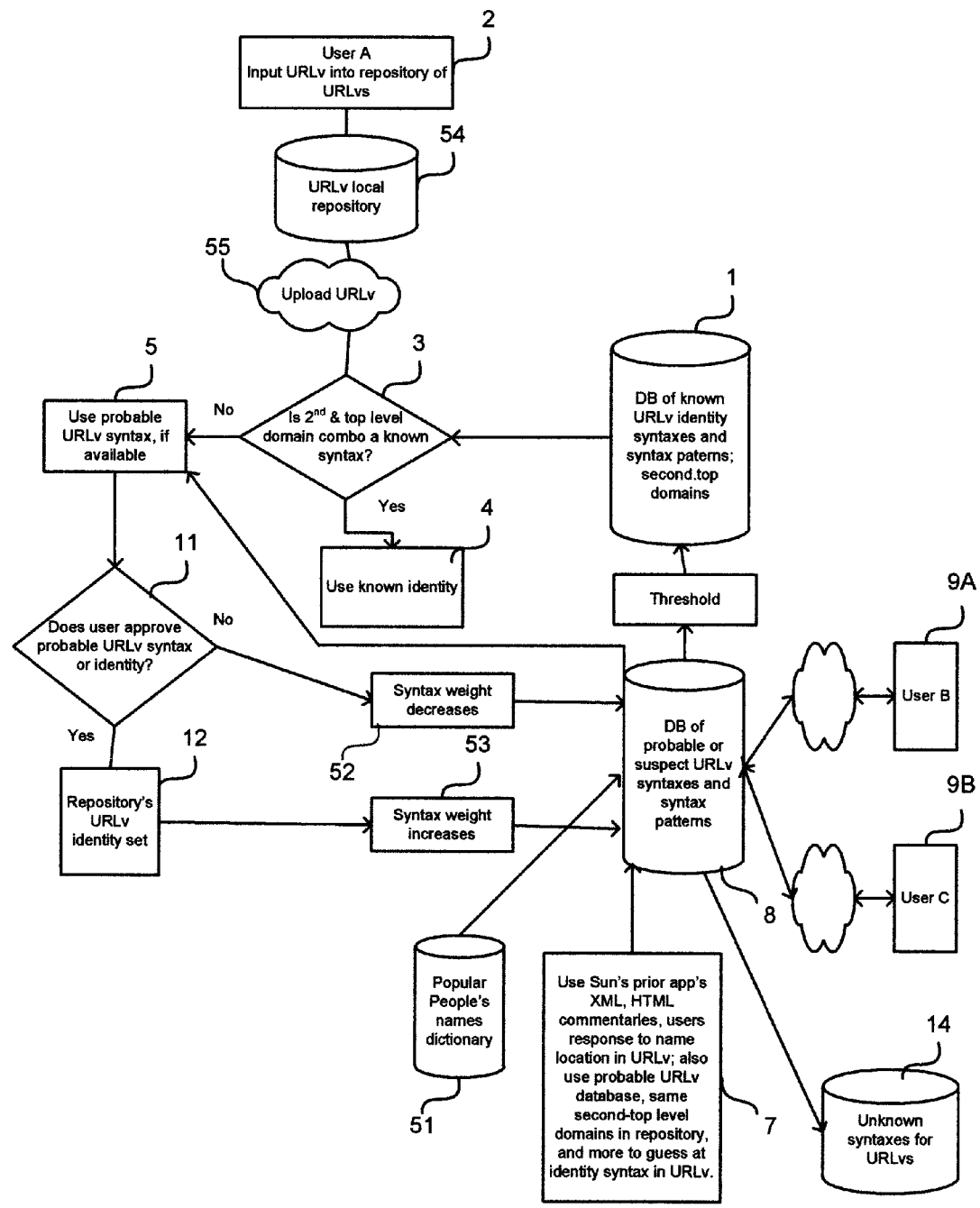
FIG. 5 shows a flow diagram for Identity Syntax from Shared Server

In another type of embodiment still, as shown in FIG. 5, the URLvs are not weighed at the local contact entity level and are quickly uploaded ((55) in FIG. 5) as part of the contact entity information and/or contact manager, to the database of suspect and probable URLv syntaxes level ((8) in FIG. 5), where other users ((9A) and/or (9B) in FIG. 5) have also uploaded their URLvs, contact entity information, and/or contact manager information. Here, all the above weight factors can be processed ((7) in FIG. 5). Additionally, because there are so many more URLvs available for probability and statistics methods analysis, additional weight factors can be applied. Notice that FIG. 5 is very similar to FIG. 1; the same numbered labels frequently refer to the same processes and parts.

One weight factor is to run the parsed URLv components to compare with a popular people's names dictionary database ((51) in FIG. 5). Such a database can be created by listing popular people's names or it may be extracted from popular names listed in sources such as a phone book.

For example, consider the following uploaded URLvs. John.ABC.com/FS1, . . . . John.ABC.com/FS2, . . . . John.ABC.com/FS10 occurs in 10 of the contact entities uploads. Mary.ABC.com/FS11, Mary.ABC.com/FS12, . . . . Mary.ABC.com/FS30 occurs in 20 of the contact entities uploads. WW5.ABC.com/FS31, WW5. ABC.com/FS32, . . . . WW5.ABC.com/FS42 (William Wallis the fifth) occurs in 12 of the contact entities uploads. MNK3rd.ABC.com/FS51, MNK3rd.ABC.com/FS52, . . . . MNK3rd.ABC.com/FS60 (Murum Ngh Krem the third) occurs in 10 of the contact entities.

"John" and "Mary" are detected by the popular English names dictionary as containing names in the third level domain name, so [Name.ABC.com] becomes a possible syntax. If still more names are found, e.g., {Joe.ABC.com}, {Jane.ABC.com}, this-popular-name-in-URLv-syntax weighing factor would be increased. If the threshold is eventually surpassed (utilizing all the weighing factors), [Name.ABC.com] becomes a known URLv identity syntax ((1) in FIG. 5), and {MNK3rd.ABC.com} and {WW5.ABC.com} will also become known identities.

Another weighing factor is also now available with the large numbers of URLvs available. URLvs with identities from the same individual tend to be concentrated in the individual's contact entities. To explain, suppose 100 contact entities from 10 contact managers are uploaded, and 1,000 total URLvs are uploaded.

(John.ABC.com/FSxx), where FSxx is any file suffix, is found in 100 of these URLvs. These URLvs will tend to be concentrated with the "John" contact entities that they came from; hence an example of the distribution of the 100 is 5 in one contact entity, 5 another, 3 in third, etc. It will unlikely be an even distribution of 1 John.ABC.com/FSxxx among the 100 contact entities. Probability and statistics methods can measure the degree of concentration, and this becomes a weighing factor.

Numerous other probability and statistics methods can be applied, once there are numerous URLvs, contact entities information, and contact management information uploaded. Furthermore, if the web version of the contact manager is being used, the contacts information is readily available for the algorithms, and far more information is attained. Note though that people generally prefer to keep their contacts information local. However, in other repository versions of this, e.g., eCommerce, discussion forums, dating . . . others mentioned, the web version data will expedite the identity syntax determination process.

Additional enhancements still can be that when the syntax is unknown, the probable syntax database ((8) in FIGS. 1 and 5) automatically suggests a probable syntax ((5) in FIGS. 1 and 5) to the URL local repository, and determines if the user accepts this ((11) in FIGS. 1 and 5). If not, the probable syntax weight is decreased, and if an alternative probable syntax is available, it is proposed again ((5) in FIGS. 1 and 5) to the user. If yes, the probable syntax weight is increased.

If sufficient numbers of users accept, this is a strong weighing factor that indicates to the probable syntax database that it is the syntax. If insufficient users accept, the probable syntax database would acknowledge its inaccuracy, and attempt to find another probable syntax. Again, when the web applications are solely on the web server, this is easier.

FIG. 2 Probabilistic Identity Syntax Passes Multi-user Acceptance Threshold to become known Identity Syntax—USI A single user assigning an URLv identity or syntax to an individual may be inaccurate. Numerous users assigning such identities and syntaxes are far more accurate, particularly, when the users are assigning through personal contact managers, the first embodiment.

With more users' confirmations, the database of probabilistic URLv syntaxes ((8) in FIGS. 1 & 2) can yield more statistically valid results, and pass a threshold to become known URLv identity syntaxes ((1) in FIGS. 1 & 2). Passing thresholds using weighted factors and probability and statistics methods is a well-understood concept in probability and statistics.

The "pass threshold?" ((21) in FIG. 2) is an algorithm that determines whether probabilistic syntaxes stored in a database (8) can become known syntaxes stored in a database (1). Other USI contact manager users (e.g. (9A) and (9B) in FIG. 1 & (9) in FIG. 2) also loads the probabilistic URLvs into the database (e.g. (1) in FIGS. 1 & 2). In its simplest method, simply a large number of users contact entities containing in the URLv database field with same identity syntaxes can be sufficient for an algorithm in USI to determine a known identity. For example, if 500 contact entities had [Name.ABC.com] as probable URLv identity syntax, the algorithm could set [Name.ABC.com] as a known identity syntax because of the large quantity.

In one or more embodiments of the invention, lesser numbers of contact entities are used to establish known identity syntax. If the weighted probable values are also transferred to the database of probable syntaxes ((8) in FIG. 2), probability and statistics methods can calculate more accurate identity syntax faster. For example, if 10 had [Name.ABC.com] with a score of 23 in probabilistic rating, and the threshold weighted score was 200, then this 230 score would make [Name.ABC.com] a known identity syntax.

Suppose the threshold algorithm also requires the weighted criteria of more than 1 individual, and {John.ABC.com} was the only identity in the 10 contact entities. When identity {Mary.ABC.com} is uploaded, the threshold is then met, and [Name.ABC.com] becomes a known identity syntax. A contact entity can also have multiple profiles of {John.ABC.com}, each capable producing a [John.ABC.com]. Whether the subsequent profiles are worth as much weight value as the first, is something that can be adjusted in the algorithms.

The specific weights, criteria, and algorithms will differ with different implementations. The first USI embodiment includes the upload of the probable identities syntax, their probable weight, and the original URLvs. This relatively small amount of data upload ensures accurate algorithm calculations while reducing storage and bandwidth requirements. As the databases of known and probable identity syntaxes grow, any USI can quickly identify most any URLvs containing an identity. Using identify syntaxes is more efficient than using known identities, because a syntax can cover numerous identities, and thus expedite processing and reduce storage. By uploading the optional, relatively small amount of data of the original URLvs as well, we can also have available for use, as seen later, the URLvs for a known identity URLv database.

One or more embodiments of FIG. 2 are usually on a web server with web databases, with users' http: devices, such as personal computers, PDAs, cell phones, terminals connected to the Internet to access the web server.

MIS—Multi-identity Syntax URLv Repositories

SSIRA used a set-identity URLv syntax to organize its contact entities' individuals. SSIRA then web accesses URLvs to extract, select, organize, sort, prioritize, and consolidate data to form a single individual contact entity in the contact management system. In this embodiment, FIG. 3's MIS (multi-identity-syntax) now works with multiple identity syntaxes.

MIS's first embodiment is a personal contact manager that comprises of contact entities, each of which represents an individual. Contact manager users usually personally know the contact entity's individual; and it follows that a contact entity's inputted URLvs, even with differing second.top domain identities, usually represent the same individual.

We can see how a MIS works, by observing the following example using identified, unidentified, and website URLvs found in a contact entity.

TABLE 1

| MIS's URLv datafield content |
|---|
| Robert.ABC.com/FS2 |
| ABC.com |
| MNO.com/3533/John~erei.php |
| Robert.ABC.com/FS1 |
| PQR.com/ader/kere/index.html |
| Ebay.com/product/John |
| www.ABC.com |
| DEF.com/Bob |

Step 1 Identity Syntax Determined (from above UIS)
[Name.ABC.com]
[DEF.com/Name]
Step 2 Identities Established:
{Robert.ABC.com}
{DEF.com/Bob}
Step 3 URLvs Organized by Identified, Unidentified and Website URLvs.

If "www" is prefaced and there is no file suffix for the second.top domains or only second.top domains are inputted, these indicate a website URLv rather than an identity URLv.

TABLE 2

| URLv | Identified, Unidentified, or website? |
|---|---|
| Robert.ABC.com/FS1 | Identified URLv |
| Robert.ABC.com/FS2 | Identified URLv |
| DEF.com/Bob | Identified URLv |
| MNO.com/3533/John~erei.php | Unidentified |
| PQR.com/ader/kere/index.html | Unidentified |
| Ebay.com/product/John | Unidentified |
| www.ABC.com | Website URL |
| ABC.com | Website URL |

Step 4 Extract Individual's Data from Identified URLvs Based on Extraction Method Described in SSIRA.

TABLE 3

| URLv | Identified, Unidentified, or webpage? | Occupation Data | Name Data | Dating Stat |
|---|---|---|---|---|
| Robert.ABC.com/FS1 | Identified URLv | | Robert | Single |
| Robert.ABC.com/FS2 | Identified URLv | Accountant | | |
| DEF.com/Bob | Identified URLv | Accountant | Bob | |
| MNO.com/3533/John~erei.php | Unidentified | | | |
| PQR.com/ader/kere/index.html | Unidentified | | | |
| Ebay.com/product/John | Unidentified | | | |
| www.ABC.com | Website URL | | | |
| ABC.com | Website URL | | | |

Step 5
Select, sort, prioritize, and consolidate data, like as described in SSIRA.

TABLE 4

| Name Data Field | Occupation Data Field | URLv Hyperlinked datafield, with URLvs in a drop down menu |
|---|---|---|
| Robert (priority over Bob) | Accountant (consolidated) | Robert.ABC.com/FS1 Robert.ABC.com/FS2 DEF.com/Bob MNO.com/3533/John~erei.php PQR.com/ader/kere/index.html Ebay.com/product/John www.ABC.com ABC.com |

We can see MIS's result is a singular database-record, easy-to-read contact entity with consolidated data and with web-linked identified, unidentified, and website URLvs. There are now two identity syntaxes used—[Name.ABC.com] and [DEF.com/Name].

In most prior art contact managers, for examples Microsoft Outlook and Sage CRM's ACT, the contact entity user interface has only one web-linked datafield designed for a website URLv (in Outlook 2003, this is the Web Page Address data field), and none specifically for a URLv identity. Migrating from the prior-art contact management systems Outlook or ACT to MIS requires minimal user interface change. A drop down menu of inputted URLvs is added to the prior-art's web-linked URLv data field, and MIS's algorithm now works on this datafield, sorting the identified, unidentified, and website URLvs. In all, a simple migration path for prior-arts to upgrade to the invention.

Figure 3:
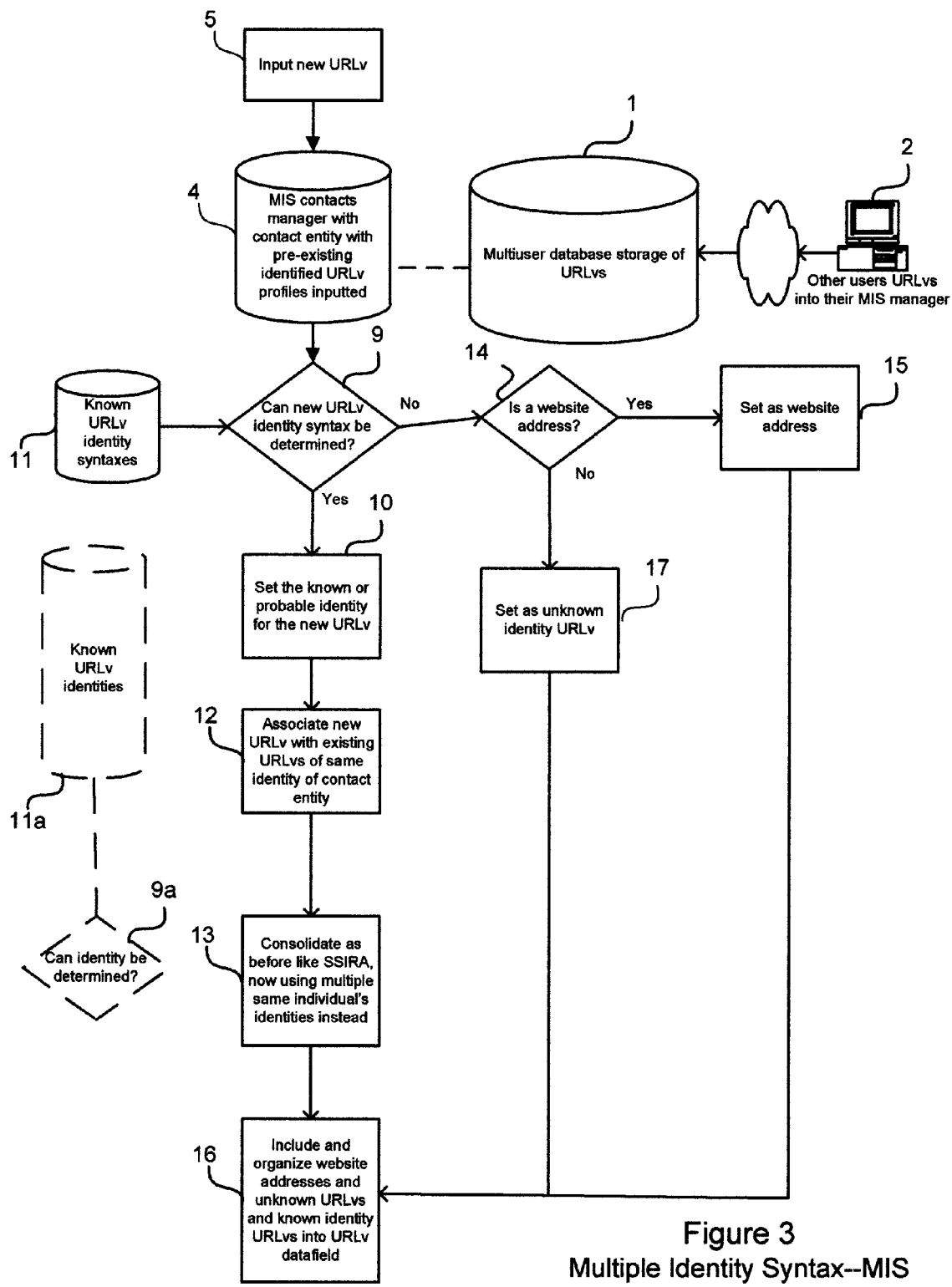
FIG. 3 shows a flow diagram for multiple identities in multiple identity syntax (MIS) repository

FIG. 3 additionally shows how MIS works. Many users input their contacts' URLvs into their own MIS contact manager ((2) and (4) in FIG. 3). These contact managers can be part of a MIS multi-user common database ((1) in FIG. 3), whereby each user would be able to input and retrieve his-inputted URLvs and associated data, or can be a single user's contact manager ((4) in FIG. 3). The multi-user database can organize the inputted URLvs by which user had input and to which contact entity the URLv belongs.

To further explain using sample data and FIG. 3, a specific user's MIS contact manager ((4) in FIG. 3) includes a contact entity with two sample identified URLvs Robert.ABC.com/Ford and www.DEF.com/Bob/Chevy belonging to the same individual. Both ABC.com and DEF.com have identified syntaxes ((11) in FIG. 3), previously derived by UIS above. The name "Robert" has been extracted from the two URLvs' web content and placed into this contact entity.

When new URLv Robert.ABC.com/Chrysler is inputted ((5) in FIG. 3), MIS parse Robert.ABC.com/Chrysler to identify identity {Robert.ABC.com} from the database of known identity syntaxes ((9), (11) in FIG. 3). Identity {Robert.ABC.com} is then set as Robert.ABC.com/Chrysler's identity, ((10) in FIG. 3), and this identity is used to associate Robert.ABC.com/Chrysler with other URLvs with same identity ((12) in FIG. 3). Robert.ABC.com/Chrysler's web-accessed extracted data is then consolidated with Robert.ABC.com/Ford's, much alike as described in SSIRA processes. www.DEF.com/Bob/Chevy web extracted data is further consolidated, resulting in a contact entity with 3 URLvs' selected and extracted data ((13) in FIG. 3). If www.DEF.com/Bob/GM is then inputted, the contact entity would have 4 URLvs' selected and extracted data.

In prior art contact management practice, the user would use the contact manager's search feature to find the contact entity for Robert and input the new URLvs into its URLv database field. In the embodiment, the contact manager can have a feature of an input field for all URLvs ((5) in FIG. 3). Because the contact manager had assigned URLv identities {Robert.ABC.com} and {DEF.com/Bob} to Robert-contact-entity, when the user inputs same-identified URLvs, the contact manager will associate and add these to the Robert-contact-entity ((12) in FIG. 3). For example, inputted URLv Robert.ABC.com/Chrysler's identity is identified to be {Robert.ABC.com}, searched in the contact manager, matched with the contact entity's containing the same identity of {Robert.ABC.com}, and inserted into the contact entity's URLv datafield.

If the contact manager does not contain matching identity, the user can use prior art search method to find the URLv's individual. When user manually places a different identity URLv into an existing contact entity's URLv datafield, this commences the association process of the URLv to the individual, as a contact entity refers to an individual. Lastly, the user can also use this new identified URLv (Robert.ABC.com/Chrysler) to web extract and select its web content so as to create a new contact entity.

Using the identity syntax database is efficient, because it is far smaller than an identities database. However, an identities database can also be used. In another embodiment, an identities database (e.g. (11a) and (9a) in FIG. 3), instead of the identities syntax database is substituted. The advantage is that the weights can be more accurate (higher), as a known identity has slightly more weighing value than a known identity syntax for associating an individual. Here, instead of databases of identities syntax, databases of identities are created ((11a) in FIG. 3). A similar set of actions of weights, correlations, and associations take place as described in above syntax becoming identified. The database ((11a) in FIG. 3) would substitute for syntax database in the above steps.

If the identity syntax of the new inputted URLv cannot be determined ("No" decision in (9) in FIG. 3), the inputted URLv is assessed as to whether it is a website address by the www or null prefixes ((14) and (15) in FIG. 3) or an unknown identity URLv ((17) in FIG. 3). All the URLvs can be then organized in the URLv datafield, similar to Table 4, additionally categorizing identified, probable, unidentified, and website addresses, if preferred.

A MIS can have its multi-user database, known URL identity syntaxes database, and/or known URLv identity databases on a web server, and the user simply accesses these databases from his personal computer, laptop, terminal, PDA, cell phone, and other http: accessible personal devices. The location of the MIS databases can also be local to the user, as the multi-user, the identity, and syntax databases can be local.

Figure 4:
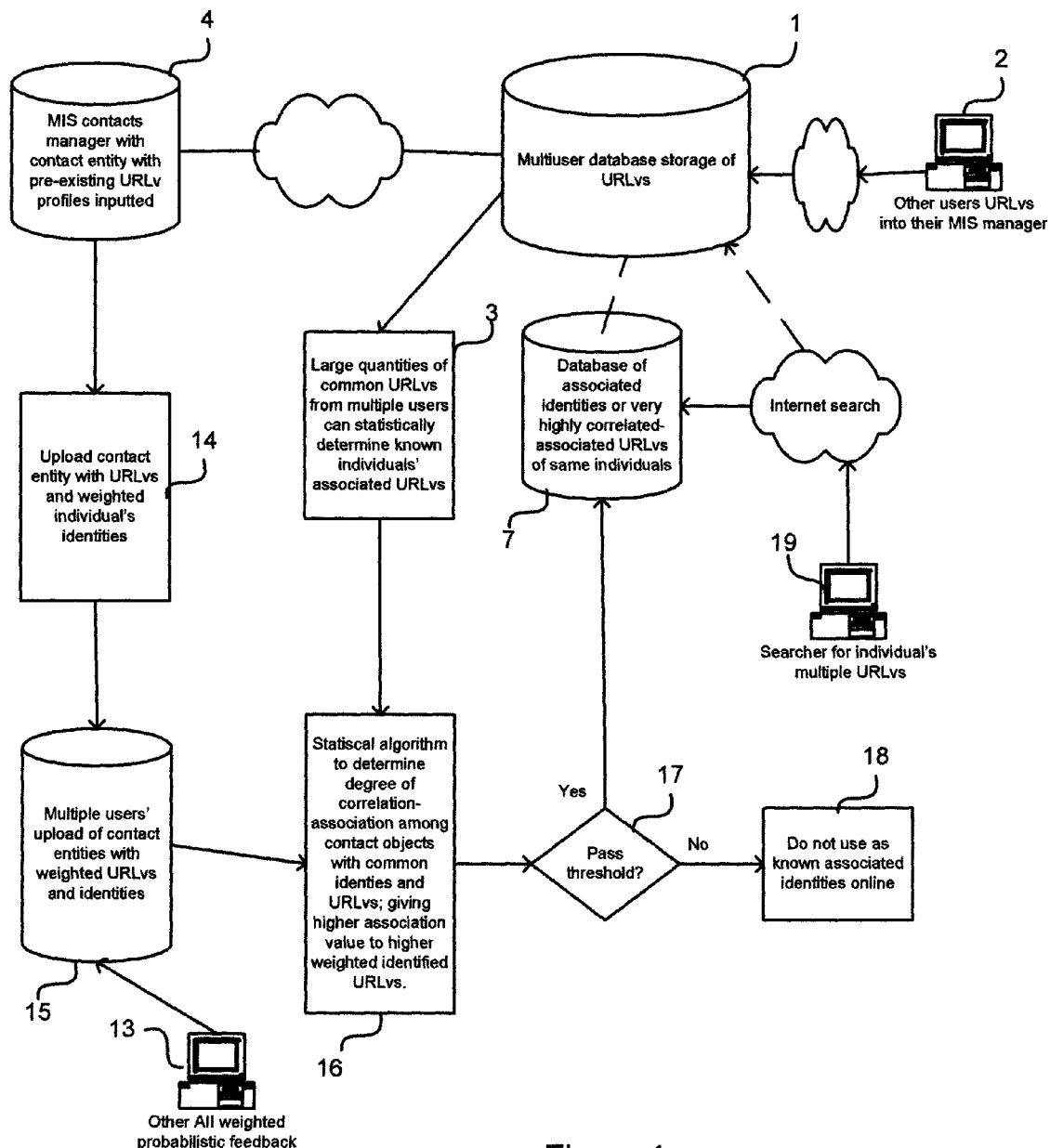
FIG. 4 shows a flow diagram for AII and Correlating-Associating these to Same Individual

FIG. 4—Does Direct Correlation of Multiple Users' Contact Entities' Same URLvs Indicate These URLvs are for the Same Individual?

People have multiple webpage profiles and identifies. Consider for example, two unidentified- or unknown-identity-to-contact-manager URLvs of Robert.MNO.com/Ford and www.RPQ.com/Robert/Chevy of the same person "Robert". How is it possible to enable these URLvs with differing second-top domains to be easily computer and people recognizable as belonging to the same individual, from among the trillions of URLvs in the world?

Any single user's contact entity's inputted URLvs or user's specified identities may not be accurate due to users' input errors, deliberate distortions, misunderstandings, complex URLv structure, etc. Might a correlation of commonly held URLvs work? A high correlation among differing users' contact entities' URLvs' might suggest their common URLvs are of the same individual. For example, if Users A, B, C . . . . J (10 users) each has a contact entity containing Robert.MNO.com/Ford and www.RPQ.com/Robert/Chevy, this high 100% correlation would suggest these URLvs both represent same individual ((3) and (16) in FIG. 4).

But this direct correlation of URLvs has many difficulties. The first is that it relies on numerous users' contact managers each having such exact URLvs. Suppose a new URLv Robert.MNO.com/Chrysler was found in only 2 of the same Users A-Js' contact managers. Robert.MNO.com/Chrysler would be weakly 20% correlated with, Robert.MNO.com/Ford and www.RPQ.com/Bob/Chevy. But, these are the same individual. Or suppose, as Users are prone to input miscellaneous information in the URLv datafield, many of the Users inputted www.ebay.com/item562256384, an eBay item for sale. Despite a high correlation, an eBay URLv doesn't have any of the individual's extractable information. Hence, a high correlation of contact managers' inputted URLvs ((3) in FIG. 4) does not necessarily result in a high association of URLvs as the same individual.

FIG. 4 Correlating Multiple Identities through Known or Probabilistic Identity Syntax Among Contact Managers However, by correlating the in-common, known or probable identities and identity syntaxes of many AII contact managers' users' URLvs, a derived association of an individual's true identities and URLvs can be far more accurate. This is the purpose of AII, Associated Identity Individual.

Due to the nature of contacts managers' contact entities, the entities' unidentified and identified URLvs are now partly associated to the same individual ((4) in FIG. 4) Known-syntax URLvs receive higher probability weighing as to the individual's information and thereby higher correlation-association weight. Known-identity URLvs receive highest rating as to the individual correlation-association weight ((14) in FIG. 4). If it's an unknown identity syntax URLv, there might not be any individual's data on its web accessed webpage; and these unknown identity syntax URLvs receive lowest probability correlation-association weighing. Probable syntaxes receive an intermediate weighing. Unknown refers to unknown to the syntax or identities database, probable refers to the probable syntaxes ((8) in FIG. 2); known refers known identity syntaxes database ((1) in FIG. 2), or to the known identities database ((11a) in FIG. 3).

Whether a syntax or URLv is known or unknown is relative to the repository and its knowledge sources. For example, JKI.com can be a URLv with an identity syntax, but its identity syntax is unknown to a specific repository.

The following table shows this, where KIS refers to known identified syntax URLv, UKIS refers to unknown identity syntax, PIS refers to probable identity syntax and FS refers to file suffix. The table is a simplified example, as in practice, there would be far more than 4 users, and probability and statistics methods may be used instead of the simple weight addition method below. In the below simplified, hypothetical example, the threshold value to establish same individual association is 75.

TABLE 5

| User 1 | User 2 | User 3 | User 4 |
| --- | --- | --- | --- |
| KIS | KIS | KIS | KIS |
| JohnT.ABC.com/FS1 | JohnT.ABC.com/FS4 | JohnT.ABC.com/FS1 | JohnT.ABC.com/FS5 |
| KIS | KIS | KIS | |
| DEF.com/JohnT/FS3 | DEF.com/JohnT/FS2 | DEF.com/JohnT/FS9 | |
| KIS | | | |
| JohnT.JKL.com/FS9 | | | |
| PIS | PIS | | |
| JohnT.GHI.com/FS3 | JohnT.GHI.com/FS2 | | |
| UKIS | UKIS | UKIS | |
| JohnT.MNO.com/FS1 | JohnT.MNO.com/FS1 | JohnT.MNO.com/FS1 | |
| UKIS | UKIS | UKIS | |
| JohnT.PQR.com/FS3 | JohnT.PQR.com/FS2 | JohnT.PQR.com/FS6 | |

Identified {JohnT.ABC.com} and {DEF.com/JohnT} have differing URLvs in three of the users contact managers. Despite these differences, the same-individual-identities-correlation among these three contact entities is high because known individual's identities {JohnT.ABC.com} and {DEF.com/JohnT} are found in all three. If these all had known-identity weighing syntax of 23 (see above), the total weight is 138 (2*3*23), which establishes an identities association.

JohnT.MNO.com/FS and JohnT.PQR.com/FS are also found in all three, but have low weighted unknown identity syntaxes, so it is unknown whether MNO.com's or PQR.com's URLvs represents an individual. An correlation of JohnT.MNO.com/FS to JohnT.PQR.com/FS yields 30, (6 multiplied by weighing of 5, see above) which is not associated, but there remains some correlation value.

If probable syntaxes were weighed at 18, then JohnT.GHI.com in relation to JohnT.ABC.com has a weighted score of 82 (2*(18+23)=82) to establish association. A single occurrence of known identity JohnT.JKL.com to JohnT.ABC.com/FS1 score of 46 is not an association. Association threshold values and algorithms for calculating associations can differ in different embodiments.

In the first AII embodiment, the contact entity's URLvs, known or guess-estimate individual identities, and above guessed-syntax weight values are uploaded as a single user's contact object ((14) in FIG. 4) to a database ((15) in FIG. 4). Other users' contacts' entities' URLvs, identities, and weighing factors are also uploaded as contact objects ((13) in FIG. 4). A probability and statistics algorithm finds the correlation of in-common identities and URLvs among the contact objects ((16) in FIG. 4). A high correlation among differing users' contact objects' uploaded weighted in-common identities URLvs would indicate their in-common identities and URLvs are associated with the same individual. A threshold ((17) in FIG. 4) is established on the degree of weighted correlation, and once the threshold is surpassed, the correlated identities and URLvs of the same individual are added to the associated identities database ((7) in FIG. 4).

To further explain, if User A, User B, User C . . . . User J each has contact entity JohnT which contains MySpace.com/JohnT/Chevy and JohnT.Wordpress.com/Ford, both with previously known identity URLv syntax, this high degree of correlation with relative high weighing would indicate these URLvs and identities {Myspace.com/JohnT} and {JohnT.Wordpress.com} represent the individual JohnT. URLv profiles containing either of the two identities would belong to the same individual.

However, consider if User A, User B, User C . . . . User J's contact entities all still have known identity URLvs MySpace.com/JohnT/Chevy and with JohnT.Wordpress.com/Ford, then, some same contact entities have unknown identity syntax URLv JohnT.MNO.com/Ford, others have unknown RPQ.com/JohnT, and still others have unknown JohnT.STU.com/FS1. These three latter unknown identity syntax URLvs have low weighing factors. The identities {MySpace.com/JohnT} and {JohnT.Wordpress.com} are associated for JohnT, but the 3 unidentified URLvs JohnT.MNO.com/Ford, RPQ.com/JohnT, and JohnT.STU.com/FS1 lack sufficient correlating-association weighing values and are not associated as with the same individual Probability and statistics methods correlations of low-weight, unknown identity URLvs can also establish same individual, but requires significantly larger sample quantities ((3) in FIG. 4). For example, if 900 in 1000 contact entities that has URLv JohnT.MNO.com also has JohnT.PQR.com, this very high statistics correlation and large quantities can pass the threshold ((17) in FIG. 4) to establish an association.

If the contact entities' content is uploaded with the contact objects, additional algorithm factors can be used to determine association correlation. For example, any same email address, telephone number, XML data of the URLvs extracted data, http:// extracted data can be used to help correlate the same individual. These would have the disadvantage of increasing the database size significantly, but can add more accuracy.

Above such probability and statistics correlation-association methods are well known probability and statistics methods, and the thresholds and methods may differ for different embodiments.

An AII has its shareable database on a web server or other kinds of shareable computing. The users' contact managers are on a personal computer, PDA, laptop, or other personal computing devices or on a web server. The database can be accessed by the contact managers through the web or locally if the contact managers and AII databases are on the same server or local computing facility.

Searching for Known Individual's URLvs and Multiple Identities

The database ((7) in FIG. 4) of known individuals' associated URLvs identities can be accessed for web searches ((19) of FIG. 4). A search for an individual JohnT can yield, MySpace.com/JohnT, JohnT.Wordpress.com, other identities, and their related profiles.

In prior-art methods of searching for an individual's web content and URLvs, the searcher can submit partial contacts information about the searched-for-individual to a stored individuals' information database and perform a database search. However, this search can be slow and excessive. For example, imagine a search for all identities and URLvs for a person named "John".

Additionally, in one embodiment, the user's search ((19) in FIG. 4) could also utilize the storage of associated identities ((7) in FIG. 4) and URLvs ((1) in FIG. 4). Because the identities help consolidate the URLv profiles, the searches will be significantly faster.

In a better embodiment of the invention, a web sent form can inquire if the searcher knows of any URLvs for the individual. If the searcher inputs an identified URLv, then the individual's many identities can be used to quickly find his in the identities database ((7) in FIG. 4); and this would also tie in his many other URLvs in the URLv database ((1) in FIG. 4). If the searcher enters an unidentified URLv, its search will usually yield results ranging from none or hundreds of thousands (e.g. xxx.ebay.com) from the URLv database ((1) in FIG. 4). Occasionally, unidentified URLv may be accurate because of very high numbers of correlated, low-weighted URLvs (as explained above) can lead to identified URLvs.

Establishing Associations Other Than Through Using Contact Mangers

Utilizing differing syntaxes and multiple identities and associating multiple identities and URLvs can also be used by embodiments other than contact managers. SSIRA describes set-identity-syntax identities for eCommerce, matchmaking, employment, alumni, digital identification, national defense, discussion forum, political and social websites, social networking, and numerous other types of sites. UIS, MIS, and AII can also utilize these other embodiments. The working is comparable to the contact manager. Once a URLv identity is established in these other embodiments, the identity is used to extract, select, sort, organize, prioritize, and consolidate URLvs and their web content. Where there are multiple identities, they are allowed to further consolidate and also to correlate-associate with other identities of same individual.

One or several of the URLv input can also serve similar to "user name", as seen in many prior-art-websites. Also, website cookies can identify same individuals, even when the person enters in an USI, MIS, or AII utilizing another URLv with differing identity. Other prior-art methods of identifying same user can be used to tie in the user's inputted URLvs into same individual.

For example, in an eCommerce auto sales website, a user inputs Robert.ABC.com/Ford, and the site also uses Robert as his user name. Robert visits this website again, the cookie recognizes him, and automatically issues Robert user name. He further enters DEF.com/Bob/Chevy and Robert.ABC.com/FordMustang into the site's URLv data field for him. The site now extracts the Fords, Chevy and Ford Mustangs for sale on these three URLvs web accessed. The site then selects relevant data, sort, organize, prioritize, and consolidate, such that Robert's Chevys and Fords and non-duplicated Ford Mustangs are entered for sale into the site, under the name Robert. {Robert.ABC.com} and {DEF.com/Bob} are later associated as the same individual.

Another example is in social networking sites, for example Myspace.com, which has a syntax of [myspace.com/Name]. Here an initial URLv name is available, e.g. Myspace.com/Robert. Myspace.com would make available for additional URLvs to be inputted to Myspace.com/Robert. For example, DEF.com/Bob is added. {Myspace.com/Robert} and {DEF.com/Bob} can now be associated.

This process is similar for all the other website types mentioned above. Additionally, any website where a representation of individual identity or identities can be useful can benefit.

4 Sub-identifies

A sub-identity would typically be a directory profile being used as an identity for a series of profiles; for example, Joe.ABC.com/cars/Toyota, and Joe.ABC.com/cars/Ford. {Joe.ABC.com/cars} can also be used like an identity for the above and also be a sub-identity of {Joe.ABC.com}. Likewise, www.Myspace.com/Joe/cars/Toyota and www.Myspace.com/Joe/cars/Ford, whereby {MySpace.com/Joe} can be the identity, and {MySpace.com/Joe/cars} can be the subidentity.

Subidentities are useful where branding is valuable for the subidentity. For example, car buyers might not care about {Joe.ABC.com}—his general identity with his personal dating history, but may care much more about {Joe.ABC.com/cars}, his profile as it relates to his cars selling activities.

After usage similar to an identity, these types of subidentities can work just like identities. Branding identity and sub-branding identity can be consolidated, similar to methods in SSIRA.

Advanced Probability and Statistics Methods can be Used

The threshold above used primarily identity-weighted additions of common URLvs. Other methods can be used, including, for example, weighted statistical methods that arrive at a weighted mean, and determining whether this number exceeds the threshold. Even unweighted statistical methods can be used, but these are less efficient. All these type of probability statistics methods are well known to those with basic probability and statistics background and these methods can be used here.

Encoded Identity in Complex URLs—Background

Many web database applications can produce complex URLs that carry a code to represent the individual. For example, in a hypothetical SocialNetworking.com URL, (comparable to a Facebook.com URL): http://www.SocialNetworking.com/home.php#/profile.php?id=671298689&v=wa ll&viewas=1407187839, the "671298689" is a individual's code and is used on the majority this individual's webpages within SocialNetworking.com. Many other web databases, including discussion forum websites, blogs, auction, matchmaking, and custom-application websites, also use such individual's code in URLs. These individual-code are usually in the file suffix, due to the nature of web databases. Web database and other web applications use such individual-codes to relay information that the individual is relevant to the URLs' webpages. The second.top domain names coupled with a individual-code is called {encoded identity}. UIS, MIS, and AII can learn to identify and use the pattern syntaxes and individual-codes of many of these web databases and applications.

Figure 6:
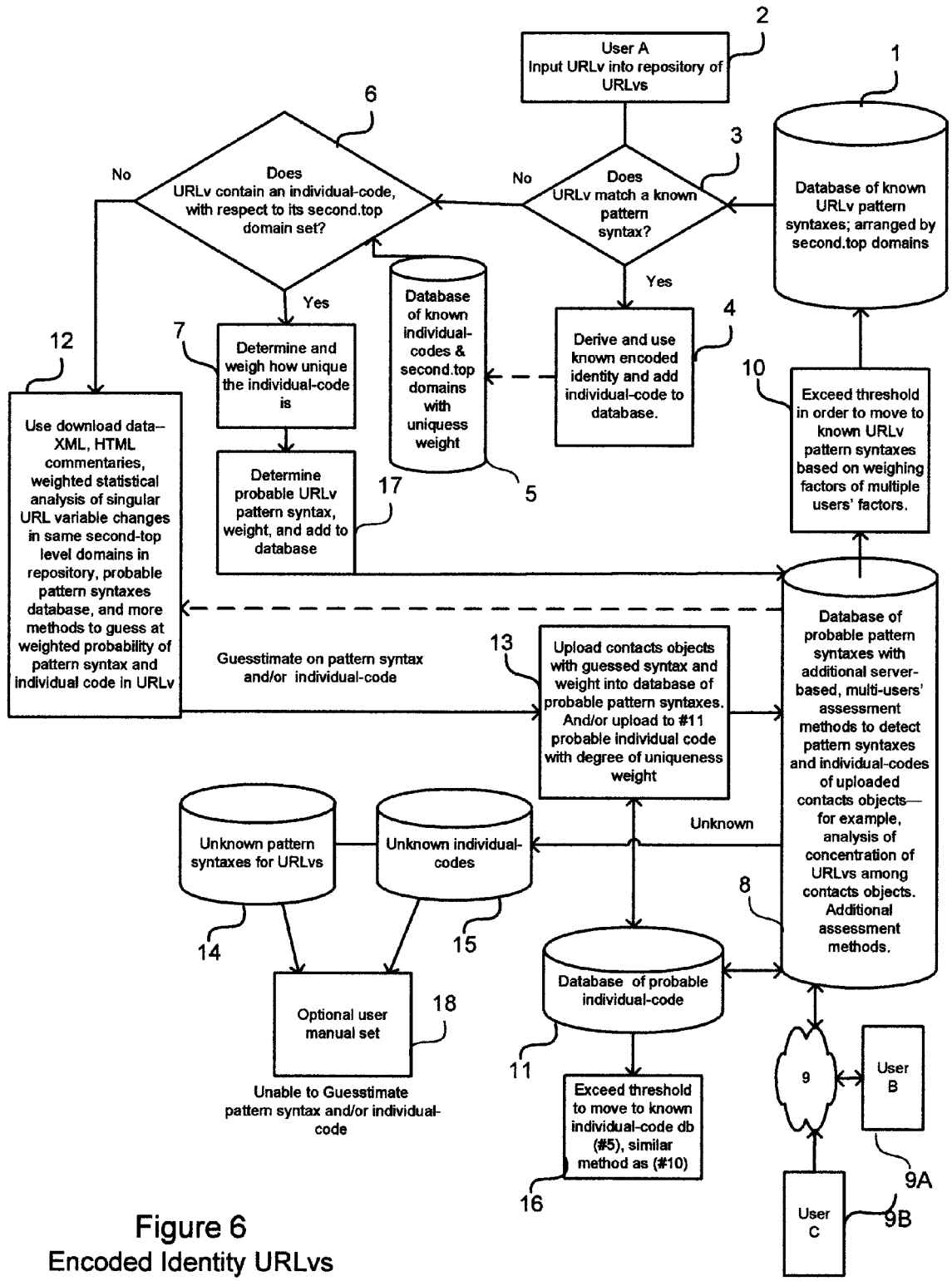
FIG. 6 shows a flow diagram of Encoded Identity URLv

FIG. 6, which is derived from FIG. 1, shows an embodiment for using encoded identity URLvs. To initiate, in the cases where SocialNetworking.com is an immensely popular or valuable website, (such as Facebook.com), it can be cost-effective for a person to examine the popular website's URLs to create some URLv syntax patterns, and populate these patterns into the known pattern syntax database ((1) in FIG. 6).

Many websites databases will use same software manufacturers' web database and application program. These websites can be detected frequently by the manufacturers' names located at the webpages' bottom. Client links from the manufacturers' websites can also indicate same software. Once the manufacturers' encoded identity syntaxes are determined and inputted into the syntax database, the same syntaxes would apply to other websites where the same software is used.

Encoded Identity—Terminology

As an example, www.SocialNetworking.com/profile.php?id=671298689, 671298689 is an individual-code. Its pattern syntax is [SocialNetworking.com/profile.php?id=individual-code]. In another, www.SocialNetworking.com/people/Laura-Stevens/671298689, 671298689 is again an individual-code, and the pattern syntax is [www.SocialNetworking.com/people/textname/individual-code]. The encoded identity is {SocialNetworking.com+671298689} and [SocialNetworking.com+individual-code] is the encoded identity syntax. This encoded identity is used by the URLvs repositories in similar way as identity is used—to organize, prioritize, and consolidate their URLvs extracted content.

Encoded Identity—Workings—Preset Known

In the following explanation, notice, if either a pattern syntax or the individual-code becomes known to the URLvs repository, it helps to make known to the URLvs repository the other. If the individual-code is known, many pattern syntaxes (as these relate to encoded identity) can be derived.

When complex URLvs are present, the encoded identity can be represented by several different URLv pattern syntaxes, and the individual-code can be in different locations in these pattern syntaxes. Comparable to an identity syntax database ((1) in FIG. 1), now we have instead known encoded identity pattern syntaxes database ((1) in FIG. 6) and a probable identity pattern syntaxes database ((8) in FIG. 6), with a threshold algorithm ((10) in FIG. 6) that determines when the probable pattern becomes a known pattern.

When the user inputs an encoded-identity URLv ((2) in FIG. 6), the FIG. 6 embodiment attempts to match it with a known pattern syntax ((3) in FIG. 6)) in the known pattern syntaxes database ((1) in FIG. 6). If matched, then the individual-code is known and the URLv's encoded identity is created ((4) in FIG. 6).

This known individual-code is further stored with its second.top domains in a database ((5) in FIG. 6). A probability weight assessment is made as to whether this individual-code is likely unique, with respect to its second.top domain's URLv. For example, if each of second.top domain's URLvs have numerous-numeric-one-digit-variables syntaxes, and the individual-code syntax is a one digit number, then the individual-code is lesser likely unique. As an illustration, individual code is "7" and URLvs are ABCD.com/5/7/9/6 and ABCD.com/3/7/5/2. If the URLvs have few-alphanumeric-variables syntaxes, and the individual-code is a 10 digit alphanumeric variable syntax, the individual-code is greater likely unique. As an illustration, individual code is 5783435663 and URLvs are ABCD.com/id=5783435663 and ABCD.com/id=6789257853.

If no pattern syntax matches, a determination is made as to whether the inputted URLv contains a known individual-code matching with its second.top domain ((5) and/or (6) in FIG. 6). Once an individual-code is known, it can usually also be used to determine new pattern syntaxes for SocialNetworking.com. For example, if the new URLv entered is www.SocialNetworking.com/eCommerce/671298689/cat-?prodid=5343234, the known individual-code (671298689) would enable a guess-estimate that the pattern syntax here is [SocialNetworking.com/eCommerce/individual-code/cat-?prodid=5343234].

The probability weight of the individual-code now affects the weighing of the probable pattern syntax ((7) and (17) in FIG. 6). If the known individual-code is greatly likely unique, then the syntax determined ((17) in FIG. 6) is sent to the database of probable pattern syntaxes ((8) in FIG. 6) with a very high weight (a known, high-weight individual-code can make the probable syntax a known syntax). If it's lesser-likely unique, the syntax is sent with a low weight ((7) and (17) in FIG. 6). These weights and pattern syntaxes are then sent to the database of probable URLv syntaxes ((8) in FIG. 6).

Encoded Identity—Workings—Preset Unknown

Other than the person-created URLv syntaxes, URLvs with encoded identities will be initially unknown to the embodiments, and have to be learned. Again, similar to the prior embodiments' explanations, using the examples of several users' contact managers to guess-estimate pattern-syntaxes and individual-codes, can help to explain how this can be learned. Embodiment types other than contact managers also can be used. Henceforth "'UC' SocialNetworking.com" will mean to assume that such URLv is initially unknown coded in pattern syntax or individual code to the repository.

Because "UC" SocialNetworking.com's individual-code can be cryptically coded, can occur in different parts of the URL, and may not even exist, it can be difficult to derive the individual-codes. Additionally, some of the prior embodiments' guess-estimate identity assessment methods described above—for examples XML and user selections—are less accurate on individual's encoded identity assessment methods, because the addressed webpage's download data will unlikely directly show the individual-code, and individual-codes can be difficult for humans to select. For example—www.SocialNetworking.com/photo.php?pid=30119041&op=1&o=global&view=global&subj=671298689&id=1329990159—numerous numbers here resemble an individual-code to the user selection.

It will be challenging to determine the pattern identity syntax for all such complex URLvs, but we can for many. To begin with, let's note some tendencies of these complex URLvs:

1. Web database almost always use the file suffix portion of URLs, so we can ignore the third and higher domain names for finding identities.
2. The URLv individual-code is often either numeric or cryptic, e.g. m34K753MT, or it is an actual name.
3. Programmer-issued-prefixes to individual-code, such as "id=", "account=", frequently reveal the URLv's individual-code. The ensuing text is given high weighing value as an individual-code.
4. Perhaps most importantly, once a single URLv individual-code is determined for just one individual's second.top domain names, his same domain names' pattern-syntaxes (as these relate to individual-code) are usually easy to determine. And once one individual's webpages' URLv pattern syntaxes are determined, many, most, or all the other individuals' URLv pattern syntaxes of the same second.top domain names are determined.

Because of the wide ranging number of syntax variables that can be involved in complex URLvs, probability weights issued at the local-to-user level are less accurate, for the lack of sufficient numbers of URLvs to verify the accuracy of the guess-estimate identity syntax. ((12) in FIG. 6) shows some of the probability weight factors issued at local-level. Most of the same weight factors as in the FIG. 1 embodiments, such as XML, HTML commentaries ((7) in FIG. 1), can be incorporated here. Below are additional local-to-user-level weight methods for assessing encoded identities. Again, the below, uses contact managers as an easy-to-explain embodiment, and other aforementioned embodiment types can be used.

1. Same local contact manager may have several individuals' contact entities with URLvs containing same second.top domain names. So, for example, if "UC" SocialNetworking.com/?profileid=1534356 occurred for one contact entity, and for another contact entity "UC" SocialNetworking.com/?profileid=671298689 occurred, the pattern syntax guessed is [SocialNetworking.com/?profileid=individual-code], and the two guess-estimate encoded identities are {SocialNetworking.com+1534356} and {SocialNetworking.com+671298689}. This example deals with two contact entities, but with more, this syntax will be more statistically accurate. ("Profileid" itself cannot be an encoded-identity because the URLvs are in separate contact entities. "Profileid=(uniquenumber)" can be an individual code.)
2. The general idea in #1 is that if similar URLvs patterns of same second.top domains in separate contact entities of a same-user, local contact manager have the same URLvs, except for a single variable, and this variable differs in each such contact entity, then the variable is highly likely to be the individual-code and probability weighted such. Furthermore, if the variable is prefaced by "... id=", this increases the probability weight.
3. Same individual contact entity has several URLvs with the same second.top domain names. Because of the nature of the contact entity and web database-created URLv syntax, such URLvs will possibly have the individual-code as the most common cryptic text entity or number in these URLvs. Hence a guess-estimate weight factor here is a high number of same cryptic code in a contact entity's URLvs. For example, several "UC" SocialNetworking.com's URLvs in a contact entity have a common number of 671298689; hence, 671298689 as the guess estimate individual-code would be probability weighed more.

The shared server level ((8) in FIG. 6) has common databases where multiple users ((9) in FIG. 6) have added their probable syntaxes and individual-codes. This shared database ((8) in FIG. 6) contains the syntax and individual-codes assessment methods of the local-level ((12) in FIG. 6), modified and applied toward multiple users URLvs syntaxes and individual-codes. And the database contains additional methods, including probability and statistics algorithms, to process and assess pattern syntaxes and individual-code-syntax of numerous uploaded contact objects. The original URLvs with any local-to-user guess-estimate(s) weighted individual-code or pattern-syntax, as well as other desired contact entities information (with the downside of added bandwidth) are uploaded ((13) in FIG. 6) as a contact object to a probable pattern syntax database ((8) in FIG. 6) shared by other users ((9A) and/or (9B) in FIG. 6).

4. At this server level, there are now far more uploaded URLvs, probable pattern syntaxes, and probable individual-codes. The weighing rules from above local-to-user level can be applied on far more URLvs, resulting in more accurate pattern syntaxes and individual-codes. More probability and statistics methods can be applied.
5. Due to their origination in the contact entities, the same individuals' individual-codes will be concentrated in certain same individual contact objects. Probability and statistics methods can be applied to detect the common-occurring, concentrated-suspect-individual-codes, and guess-estimate these as individual-codes.
6. User feedback mechanisms can be used, similar to ((10) & (11) in FIG. 1 and (11) in FIG. 5); however, this is less reliable for the embodiment shown in FIG. 6, due to the complexity of the URLvs, and this lesser accuracy should reflect in lesser probability weight. XML data and other data exchange may also yield information on the syntax or individual code, but this can be unreliable.

An additive process ((10) in FIG. 6) similar to FIG. 2's can be used now to determine whether a weighted probable pattern syntax ((8) in FIG. 6) passes the algorithmic threshold ((10) in FIG. 6) to become a known pattern syntax ((1) in FIG. 6). Likewise for probable-individual-codes ((11) in FIG. 6) passing threshold ((16) in FIG. 6) to become known individual-codes to be added to such database ((5) in FIG. 6). Probability and statistics methods other than additive can be used.

Below is an example of how probable encoded identities become known, with parenthesis numbers tying into FIG. 6.

Step 1: Person-created Pattern Syntax in Database—Tables 7

TABLE 6

Initial input URLv ((2) in FIG. 6)

www.SocialNetworking.com/eCommerce/671298689/cat?prodid=5343234

TABLE 7

Initial Known Pattern Syntax in database ((1) in FIG. 6)

www.SocialNetworking.com/eCommerce/individual-code/cat?prodid=5343234

(Another embodiment begins instead with set known individual-codes in individual-codes database, and as the URLv are inputted ((2) in FIG. 6), creates the pattern syntax for those URLvs with the individual-codes.)

Step 2 Compare Table 6's URLv with Syntax Pattern in Table 7 ((3) in FIG. 6).

Match found, individual code is 671298689 and is added to the database of individual-codes ((5) in FIG. 6), and encoded identity is {SocialNetworking.com+671298689}.

Step 3 Enter next URLv
www.SocialNetworking.com/eCommerce/771298699/cat?prodid=534323 4

Pattern syntax match is again found ((3) and/or (1) in FIG. 6), and encoded identity is {SocialNetworking.com+771298699}.

Individual-code of 771298699 is added to the database of known individual-codes ((5) in FIG. 6).

Step 4 Third Entered URLv www.socialnetworking.com/Blog/671298689/today

No match in pattern syntax ((3) and/or (1) in FIG. 6).

671298689 is a known individual-code ((5) in FIG. 6) with socialnetworking.com, so the determination ((6) in FIG. 6) is to create probable pattern syntax of [socialnetworking.com/Blog/individual-code/today] ((7) and (17) of FIG. 6) and send URLv pattern syntax to database of probable pattern syntaxes ((8) in FIG. 6).

Step 5 Likewise, Several Other Users also have Entered into their Contact Entities www.socialnetworking.com/Blog/671298689/today ((9) in FIG. 6)).

The likelihood of [socialnetworking.com/Blog/individual-code/today] being a known pattern syntax is significantly increased in the database of probable pattern syntaxes due to more users recognizing same URLv as belonging to an individual-code.

In the database of probable pattern syntaxes ((8) in FIG. 6), this means higher weight probability.

Step 6 www.socialnetworking.com/Blog/432356323/today is next inputted ((2) in FIG. 6), passing through (2), (3), (6), (12) in FIG. 6.

The probable syntaxes database ((8) in FIG. 6) notes this matching URLv, and extracts 432356323 as a possible individual-code, and places this into database of probable individual-codes ((11) in FIG. 6).

Step 7 www.socialnetworking.com/wiki/34323434/id=Me1234.php is next inputted ((2) in FIG. 6).

This does not match any known or probable syntax pattern ((3) and (12): (1) and/or (8) in FIG. 6) and doesn't have any known individual-code ((6): and/or (5) in FIG. 6). The guesstimate methods of assessing within the repository ((12) in FIG. 6) do not yield adequately accurate guesstimate of pattern syntax and/or individual codes. To further assess whether URLv pattern syntaxes or individual codes exist, the URLv is moved to the server level where there are many other users' like URLv uploaded contacts objects. Here, still more numbers of assessment methods are applied ((8) in FIG. 6) on groups of contacts objects. Some methods include aforementioned "id=", the contact entities' concentration of same second.top URLvs' codes, downloadable data matching, and other probability and statistics methods applied on groups of contacts objects.

If a guess-estimate is made on the pattern syntax and/or individual-code ((13) in FIG. 6), these are placed into either the database of probable pattern syntaxes ((8) in FIG. 6) and/or probable individual-code ((11) in FIG. 6). 34323434 or Me1234. php become suspect (low weight) individual-codes with respective suspect [socialnetworking.com/wiki/individual-code/id=Me1234. php] and [socialnetworking.com/wiki/34323434/id=individual-code.php] syntaxes. Note again that the pattern syntax and individual-code are directly related.

Step 8

The various weighing factors and quantities are taken accumulated and added or otherwise probability and statistics measured (including weighted means methods), and if the pattern syntax or individual-code weighing exceed a set threshold ((10) and (16) in FIG. 6), these can be placed into known pattern syntax ((1) in FIG. 6) or individual-code database ((5) in FIG. 6). For example, as more URLvs are entered, it is determined that the [socialnetworking.com/wiki/34323434/id=individual-code.php] is more accurate due to that Me1234 shows up concentrated in many contact entities.

Sufficient numbers of analyses of the suspect (low-weight) individual-codes and pattern syntaxes can increase their total probability weight value to become probable codes and syntaxes, and eventually become known codes and syntaxes. Such are methods known in probability and statistics, and probability and statistics algorithms can vary and be adjusted for the applications.

Step 9 www.AnyDomain.com/discuss/34387433/id=Joe9876.php is entered ((2) in FIG. 6).

Again, this has no known matching pattern ((6) in FIG. 6) and is uploaded ((8), through (12) and (13), in FIG. 6) to be assessed with other URLvs with "AnyDomain.com" second-.top domains, similar to step 8.

Step 10 The End Result of the Above Steps are:

{SocialNetworking.com+771298699} and {SocialNetworking.com+671298689} can both be used now as encoded identities.

In SocialNetworking.com, 771298699 and 671298689 are known individual-codes.

[socialnetworking.com/Blog/individual-code/today] is a highly probable pattern syntax that may become a known pattern syntax.

In SocialNetworking.com, 432356323 and Me1234 are probable individual-code.

[socialnetworking.com/wiki/34323434/id=individual-code.php] is a probable pattern syntax.

AnyDomain.com's URLvs remain unknown.

Step 11

If a pattern syntax or individual-code remains unknown (unable to determine pattern or individual-code) after above steps, ((14) and (15) in FIG. 6), the user can also manually set ((18) in FIG. 6) any of the unknown URLvs to a user-specified encoded identity to use in his repository, alike the manual set in (10) then (12) of FIG. 1.

Using for all URLv Types

Notice that FIG. 6's encoded identity embodiment is derived from FIG. 1. Notice also that the simple syntax of FIG. 1 is the case where the complex syntax of FIG. 6 is reduced to one variable. So, the FIG. 6 encoded-complex-URLv embodiment is comparable to FIG. 1 simple-identity embodiment, except that the simple version is not encoded and can rely more on the local contact manager's user identity-recognition acknowledgment ((11) in FIG. 1) and downloaded webpage data verification ((7) in FIG. 1); whereas, the encoded may be difficult for the user to identify the individual-code, and this individual-code might not be in the downloaded data either. Popular people's names dictionaries ((51) in FIG. 5) will also work less well with encoded versions.

Recognizing this, it is possible to integrate the various embodiment types shown in the figures to a single embodiment by: 1. integrating single variable syntax (simple) as a special form of multiple variable (complex) syntax; 2. uncoded individual names as a special form of individual-codes; and 3. providing dictionary usage and user recognition acknowledgment only where uncoded names are involved. Such an integration would simply apply all the teachings of the embodiments above. The result is that all types of URLvs can be inputted and organized according to identity, encoded identity, website, or unknown.

Accuracy of the UIS, MIS, and AII

Not all URLvs' identities will be accurately determined. However, notice by using the syntax method, once just one identity, one syntax, one individual-code, or syntax pattern is figured out for a second.top domain, most of the other identities, codes, syntax, or syntax can be determined. When there are many URLvs and their repositories in use, the odds of successful identity syntax recognition is high due to the many probability and statistics methods that can be applied, some of which are described above, and due to past recognition by other users. Where the identity or identity syntax is unreliable or inaccurate, the repository user can control its use, and if determined to be such, an inputted URLvs is set an unknown-identity URLv (e.g. (14) and/or (15) in FIG. 6; (14) in FIGS. 1 & 5).

More on Multiple URLv Profiles

In the embodiment, the individual's separate URLvs are entered into a repository, and then consolidated and organized based on an identity. It is also possible for these URLvs to be entered already consolidated. Other embodiments are also acceptable.

Notice that the concept of profiles, as initially introduced in SSIRA, is different from linked webpages of a website or that of a web database with links. Profiles are not necessarily linked to other webpages, for the sake of privacy control, as described in SSIRA. This is why the repositories can't simply send a robot to follow all the links to gather the individual's webpages information. Social networking sites usually use clumsy all-or none password or owner-acceptance privacy controls. UIS, MIS, and AII repositories use superior user-submitted URLvs for privacy controls.

Mass Adoption Methods

Two solutions to the marketing challenge of mass adoption of utilizing identities in URLvs are: 1. revise the actions of browser email-address-link-click-launch and 2. add an email-to-web-address converter in an email-contact-manger client.

In email-contact-manager clients, such as Microsoft Outlook, a new user-interface button is added that runs a script to convert a contact entity's email address to web address by substituting the email's "@" for a ".", and place this web address in a URLv field. For example: a button-launched script that takes Name@ABC.com in the email address field and creates Name.ABC.com in an URLv field.

Browsers have capabilities that a left mouse click of an email address link launches an such email-addressed email to send in an email client software. Programming changes can be made such that when such browser email address link is right mouse clicked, a web address is browser launched. For example, browser launch address Name.ABC.com when Name@ABC.com is right clicked. The http://Name.ABC.com address can display individual's web content or can redirect to a web address containing identity.

Summary

Any URLv syntax can now be used for identity syntax. Once the identity syntax is determined for a second.top domain, then, the identity can be accurately determined. Once multiple identities can be stored in a contact entity, the weighted, probability and statistics correlation of same identities among contact entities can yield accurate multiple identity names and URLvs associated with the same individual. Encoded-identity and complex URLvs also can be used.

The social impact of this invention's embodiments is immense. Consider a hypothetical example of dominant eCommerce individuals' auction site, Monopoly.com (for example, eBAY.com). Monopoly.com provides a way for individuals to auction products, and owns 70+% of its marketplace. The barriers to entry in Monopoly.com's marketplace are: its brand name, its numbers of buyers and sellers, and the amount of time it takes for an individual to list his products with another website. Let's suppose new websites Competitor1.com, Competitor2. com, . . . , and CompetitorN.com, offered identical services as Monopoly.com, and offered these with a promotional offer of no transaction fees for three years. Such competitors still face a high barrier to entry because it takes time for a seller to list his products at each Competitor's site, and listing at these new sites with few buyers would multiply his time costs of selling tremendously.

Suppose an individual seller received a webpage designed for eCommerce exchanges, containing exchangeable data and with an identified URLv, comparable to one of the ndfS-DpFDA of the SSIRA application, but with a differing URLv identity and URLv syntax. This webpage enables him to list all his products for sale, and carries data fields and data for his products. After listing once, the seller can quickly enter this URLv to sell at the newly revised Competitor1.com, Competitor2. com, . . . , and CompetitorN.com websites containing invention's embodiments. These sites' invention revision is that they can now accept individuals' multiple-identity URLvs and associated extracted data and have UIS, MIS, and AII features. The impact is that one of Monopoly.com's major barriers-to-entry (listing time) nearly disappears. Now, Competitor1.com, Competitor2. com, . . . CompetitorN.com's promotional offer of no listing fees coupled with minimal time required for product listing, will motivate individual sellers to list with them, and over time, will form a sizable sales inventory. Buyers can also register quickly at these CompetitorN.com by conveniently entering in their purchasing URLv representations.

The result is that many competitive marketplaces will emerge to compete against the dominant Monopoly.com. And with more competitive sites, the power and focus of the eCommerce shifts to the individual rather than to dominant websites. Service prices drop, service selections improve, and more and better commerce develops.

Consider another example of a monopoly type of social networking website, such as SocialMonopoly.com. Once a user places creates his content into SocialMonopoly.com, the content is not easily exchangeable with other social networking websites, and thus becomes "owned" by SocialMonopoly.com. Similarly with the nearly all the current dominant social networking websites. Using the inventions embodiments and those found also in SSIRA, a user can create his content at his preferred second.top domain; and use his resulting URLv profiles at any social networking websites, with far superior data transport ease than what SocialMonopoly.com information can provide. This will also create far more competitive social networking websites.

In one or more embodiments of the invention, software instructions to perform embodiments of the invention, when executed by a processor, may be stored on a computer readable medium such as a compact disc (CD), a diskette, a tape, or any other computer readable storage device.

While the disclosure contained herein has set forth a number of embodiments of the invention, used an easy-to-explain contact management embodiment for explanation purposes, and many of the fundamental components used within the invention are well known within the art, it will be appreciated by those skilled in the art that variations to the combination of elements and steps disclosed can be made without departing from the scope and spirit of the invention. Accordingly, the scope of the invention should be limited only by the attached claims.

What is claimed is:

1. A method of personal people information management in which a first individual can input a URLv containing an identity into his or her personal Internet-connected user URLv repository, and the URLv is automatically associated with a second individual's individual's consolidated object entity containing the second individual's other URLvs, the method steps comprising of:

providing a plurality of URLvs each containing a first second-top level domain name and a known identity of said second individual;

providing a URLv containing a second second-top level domain name and a known identity of said second individual;

providing said URLvs of said first and second second-top level domains with addressed webpages containing said second individual's data;

providing a database of known identity syntaxes for second-top level domain names and said database contains identity syntaxes of said first and said second second-top level domain names;

providing a user URLv repository with individual's consolidated object entities and with a user URLv repository's URLv input field;

providing Internet-connected processors and applications to generate said URLvs' webpages and to host said database and said user URLv repository;

inputting a said URLv containing a said first second-top level domain name into said individual's consolidated object entity;

inputting a said URLv containing a second second-top level domain name into said individual's consolidated object entity;

inputting into said user URLv repository's URLv input field a said URLv containing a first second-top level domain name wherein said user URLv repository's inputted URLv is different from the said individual's consolidated object entity's said URLvs;

deriving URLv identities of said individual's consolidated object entity's inputted URLvs and said user URLv repository's inputted URLvs based on said database of known identity syntaxes; and associating said user URLv repository's inputted URLv to the said individual's consolidated object entity containing said same URLv identity;

wherein said user URLv repository automatically associates URLvs inputted in said user URLv repository to said same second individual's individual's consolidated object entity containing differing second-top level domain names.

2. The method of claim 1, further comprising:

said user URLv repository's inputted URLv is further automatically inputted into said associated individual's consolidated object entity;

wherein said first individual inputs a said URLv into said user URLv repository's input URLv field, and said user URLv repository will automatically places said URLv into said individual's consolidated object entity with same said second individual's other URLvs.

3. The method of claim 2, further comprising:

said individual's consolidated object entity's inputted URLvs are web accessible, and the second individual's data is extracted, consolidated, and presented as data fields within the individual's consolidated object entity;

wherein said first individual saves time by simply inputting only URLvs into said user URLv repository's URLv input box, and said user URLv repository automatically populates fields in a individual's consolidated object entity and presents said fields in a individual's consolidated object entity in a compact format, without said first individual having to search for said second individual's individual's consolidated object entity in said user URLv repository.

4. The method of claim 3, wherein said identity syntaxes include encoded identity syntaxes.

5. The method of claim 3, wherein said identity syntaxes includes an identity syntax for a subidentity.

6. The method of claim 3, wherein said identity syntaxes in said known identity syntax database consist of known identities and wherein the step of deriving the URLv identities of said individual's consolidated object entity's inputted URLvs and said user URLv repository's inputted URLvs is based on said known identities in the database of identity syntaxes.

7. The method of claim 2, wherein said identity syntaxes include encoded identity syntaxes.

8. The method of claim 2, wherein said identity syntaxes includes an identity syntax for a subidentity.

9. The method of claim 2, wherein said identity syntaxes in said known identity syntax database consist of known identities and wherein the step of deriving the URLv identities of said individual's consolidated object entity's inputted URLvs and said user URLv repository's inputted URLvs is based on said known identities in the database of identity syntaxes.

10. The method of claim 1, further comprising:

providing a plurality of Internet-connected user URLv repositories each containing probabilistic URLv identity syntaxes;

providing a threshold that determines when multiple probabilistic URLv identity syntaxes become known URLv identity syntax;

establishing said known identity syntax using probabilistic and statistical methods applied to said user URLv repositories' probabilistic identity syntaxes, and then exceeding said threshold that determines when multiple probabilistic URLv identity syntaxes become a known URLv identity syntax; and adding said established known identity syntax to said known identity syntax database;

wherein said known identity syntax database is updated regularly by multiple individual's user URLv repositories.

11. The method of claim 10, wherein said identity syntaxes include encoded identity syntaxes.

12. The method of claim 10, wherein said identity syntaxes includes an identity syntax for a subidentity.

13. The method of claim 10, further comprising:

wherein said identity syntaxes in said known identity syntax database consist of known identities;

wherein the step of deriving the URLv identities of said individual's consolidated object entity's inputted URLvs and said user URLv repository's inputted URLvs is based on said known identities in the database of identity syntaxes;

wherein said probabilistic URLv identity syntaxes in said Internet-connected user URLv repositories each contain probabilistic URLv identities;

wherein said threshold determines when multiple probabilistic identities become known identity syntax, wherein said known identity syntax is a known identity;

wherein the step of establishing a said known identity syntax establishes a known identity using probabilistic and statistical methods applied to probabilistic identities in said user URLv repository's identity syntaxes; and wherein the step of adding said established known identity syntax to said known identity syntax database adds said known identity syntax, to said known identity syntax database, wherein said known identity syntax consists of said established known identity.

14. The method of claim 1, wherein said identity syntaxes include encoded identity syntaxes.

15. The method of claim 1, wherein said identity syntaxes includes an identity syntax for a subidentity.

16. The method of claim 1, wherein said identity syntaxes in said known identity syntax database consist of known identities and wherein the step of deriving the URLv identities of said individual's consolidated object entity's inputted URLvs and said user URLv repository's inputted URLvs is based on said known identities in the database of identity syntaxes.

* * * * *